US008678402B2

(12) United States Patent
Helterbrand

(10) Patent No.: US 8,678,402 B2
(45) Date of Patent: Mar. 25, 2014

(54) PORTABLE CONVERTIBLE WHEELCHAIR

(76) Inventor: Arlen Helterbrand, Sheridan, IN (US)

( * ) Notice: Subject to any disclaimer, the term of this patent is extended or adjusted under 35 U.S.C. 154(b) by 1 day.

(21) Appl. No.: 13/567,517

(22) Filed: Aug. 6, 2012

(65) Prior Publication Data

US 2014/0035253 A1 Feb. 6, 2014

(51) Int. Cl.
*B60N 2/28* (2006.01)

(52) U.S. Cl.
USPC .......... 280/30; 280/250.1

(58) Field of Classification Search
USPC .......... 280/47.38, 47.34, 47.4, 7.1, 7.15, 200, 280/250.1, 288.4, 304.1, 415.1, 30, 642, 280/643, 647, 648, 650, 654, 242.1, 278, 280/287, 293, 295, 296, 763.1; 297/DIG. 4, 297/16.1
See application file for complete search history.

(56) References Cited

U.S. PATENT DOCUMENTS

| | | | | |
|---|---|---|---|---|
| 4,926,777 | A | 5/1990 | Davis, Jr. | |
| 5,149,118 | A * | 9/1992 | Oxford | 280/250.1 |
| 5,427,398 | A * | 6/1995 | Weybrecht | 280/304.1 |
| 5,536,027 | A * | 7/1996 | Gollub | 280/30 |
| 5,634,650 | A * | 6/1997 | Hensler et al. | 280/47.38 |
| D380,991 | S * | 7/1997 | Deming | D12/131 |
| 5,647,601 | A * | 7/1997 | Potter et al. | 280/47.38 |
| 6,241,276 | B1 * | 6/2001 | Wilburn | 280/659 |
| 6,880,852 | B2 * | 4/2005 | Lim | 280/653 |
| 7,845,654 | B2 * | 12/2010 | Price, Jr. | 280/47.34 |
| 7,934,740 | B2 * | 5/2011 | Wilmot et al. | 280/304.1 |
| 2002/0140200 | A1 * | 10/2002 | Paranto et al. | 280/242.1 |
| 2004/0041361 | A1 * | 3/2004 | Lim | 280/47.31 |
| 2007/0018443 | A1 * | 1/2007 | Wilmot | 280/755 |
| 2008/0129006 | A1 * | 6/2008 | Johnson et al. | 280/149.2 |
| 2010/0109283 | A1 * | 5/2010 | Wilmot et al. | 280/304.1 |
| 2011/0095508 | A1 * | 4/2011 | Chiu | 280/304.1 |
| 2011/0101642 | A1 * | 5/2011 | Chiu | 280/304.1 |

FOREIGN PATENT DOCUMENTS

| | | | |
|---|---|---|---|
| DE | 297 17 423 | U1 | 1/1998 |
| DE | 198 48 294 | A1 | 10/1999 |
| DE | 102 37 878 | A1 | 7/2004 |
| EP | 0630634 | A1 | 12/1994 |
| EP | 1502565 | A2 | 2/2005 |
| FR | 2 423 212 | A1 | 11/1979 |
| WO | 2011 074057 | A1 | 6/2011 |

OTHER PUBLICATIONS

Landeeze wheelchair photo by Natural Access, http://www.landeez.com/?page=products, 2011.
De Bug Beach Wheelchair photo by Fleming Designs, Inc., http://www.beachwheelchair.com/Custom%20Chairs.htm, 1994.

* cited by examiner

*Primary Examiner* — Katy M Ebner
*Assistant Examiner* — Brodie Follman
(74) *Attorney, Agent, or Firm* — Bruce J. Bowman

(57) ABSTRACT

A portable wheelchair is easily convertible between a conventional or street wheelchair and a specialty wheelchair through the use of conversion components, some of which are mounted permanently to the wheelchair and some of which are received by the mounted conversion components. In one form, the portable specialty wheelchair is a portable beach wheelchair while in another form the portable specialty wheelchair is an all-terrain wheelchair or trail chair. Preferably, but not necessarily, the portable convertible wheelchair is foldable in order to provide added versatility.

16 Claims, 11 Drawing Sheets

PORTABLE CONVERTIBLE WHEELCHAIR

BACKGROUND OF THE INVENTION

1. Field of the Invention

The present invention relates to wheelchairs and, more particularly, to a portable wheelchair that is convertible between a conventional wheelchair and a specialty wheelchair.

2. Background

While there are now many types of wheelchairs, each type of wheelchair is designed with a single or dedicated purpose. For example, the typical street wheelchair one sees in hospitals, nursing homes, airports and other facilities is designed to transport a person while on relatively smooth ground, flooring, or carpet. The street wheelchair has disadvantages when used on terrain other than the typical indoor surface or conditioned outside surface—as it is difficult to push and/or navigate a street wheelchair through rough, uneven and/or sandy terrain. Many wheelchairs are pushed, guided or navigated (operated) by someone other than the person seated in the wheelchair. Therefore, the operator must then be able to control the wheelchair through the rough, uneven and/or sandy terrain.

Because people who use wheelchairs want to be able to use the same spaces others not in wheelchairs do, wheelchairs have been designed that are easier to operate on certain terrains. For instance a surface where it is difficult for a standard or street wheelchair to operate is on sandy areas/beaches. Because of their design, it is extremely difficult to push and/or navigate a typical street wheelchair on the beach. Therefore, single purpose beach wheelchairs have been developed that are easier for a person to operate than a typical street wheelchair. These single purpose beach wheelchairs however, while effective, are big and gregarious. Because of their size, they cannot be easily transported when not in use. Moreover, storage is also a problem.

Other single purpose wheelchairs have been developed for various terrains/environments. However, these single purposed wheelchairs suffer from the same disadvantages of other single purpose wheelchairs—namely, not easily transportable, storable or usable in places/terrains other than its intended places/terrains. Also, if a person wants to be able to use a wheelchair in multiple places/terrains, the user must have several single purpose wheelchairs.

In view of the above, it would therefore be advantageous to have a single wheelchair that can be used in and/or for varied terrain. Thus, there is a need for a multiple purpose wheelchair. More particularly, there is a need for a wheelchair convertible between a conventional wheelchair and a wheelchair for specialty terrains.

SUMMARY OF THE INVENTION

The present invention is a portable wheelchair that is convertible between a portable conventional or street wheelchair and a portable specialty wheelchair. The portable wheelchair is configured for reception of specialty conversion parts that convert the conventional wheelchair into the specialty wheelchair. The wheelchair includes conversion components mounted thereon that receive specialty conversion parts which convert the wheelchair into the specialty wheelchair. Preferably, but not necessarily, the convertible wheelchair is foldable in order to provide added versatility.

In one form, the portable specialty wheelchair is a beach wheelchair. In another form, the specialty wheelchair is an all-terrain wheelchair or trail wheelchair.

In a portable beach wheelchair form, the conversion components include front brackets mounted to the front wheel assemblies, rear brackets mounted to the wheelchair frame adjacent to the rear wheel assemblies, low pressure tires, and conversion support parts. The front brackets are configured to allow an axle of the conversion support parts to extend through the front wheel assemblies. An oversized, low pressure tire is mounted on each axle end. The beach conversion components further include rear brackets mounted to the frame of the wheelchair adjacent to rear wheel assemblies of the conversion support parts, each rear wheel assembly carrying a low pressure tire. The rear brackets are adapted to receive an arm of the rear wheel assembly. The configuration, type and size of the tires provide a stable wheelchair platform that is easy to push in all types of beach sands, sand terrains and/or conditions.

In another portable beach wheelchair form, the conversion components include a rear axle assembly configured for reception in existing rear axle structures for rear wheels of the street wheelchair. A rear axle of the rear axle assembly receives and carries low pressure tires. The conversion components further include front wheel assemblies configured for reception in existing front wheel supports of the street wheelchair. Each front wheel assembly carries a low pressure tire.

In the portable all-terrain wheelchair or trail chair form, the conversion components include front wheel assemblies configured for reception in existing front wheel supports of the street wheelchair. Each front wheel assembly carries an all-terrain tire. The conversion components further include rear wheel axle assemblies configured for reception in existing rear axle structures for the rear tires of the street wheelchair. The front and rear all-terrain tires are wide and have a thick tread. Moreover, the front and rear all-terrain tires are sized accordingly.

The present portable convertible wheelchair may be converted into other specialty wheelchairs through use of other conversion components and/or parts.

Further aspects of the present invention will become apparent from consideration of the drawings and the following description of preferred embodiments of the invention. A person skilled in the art will realize that other embodiments of the invention are possible and that the details of the invention can be modified in a number of respects without departing from the inventive concept. The following drawings and description are to be regarded as illustrative in nature and not restrictive.

BRIEF DESCRIPTION OF THE DRAWINGS

The features of the invention will be better understood by reference to the accompanying drawings which illustrate presently preferred embodiments of the present invention, wherein.

A description of the features, functions and/or configurations of the components depicted in the various figures will now be presented. It should be appreciated that not all of the features of the components of the figures are necessarily described. Some of these non-discussed features as well as discussed features are inherent from the figures. Other non-discussed features may be inherent in component geometry and/or configuration.

DETAILED DESCRIPTION OF THE INVENTION

Figure 1:
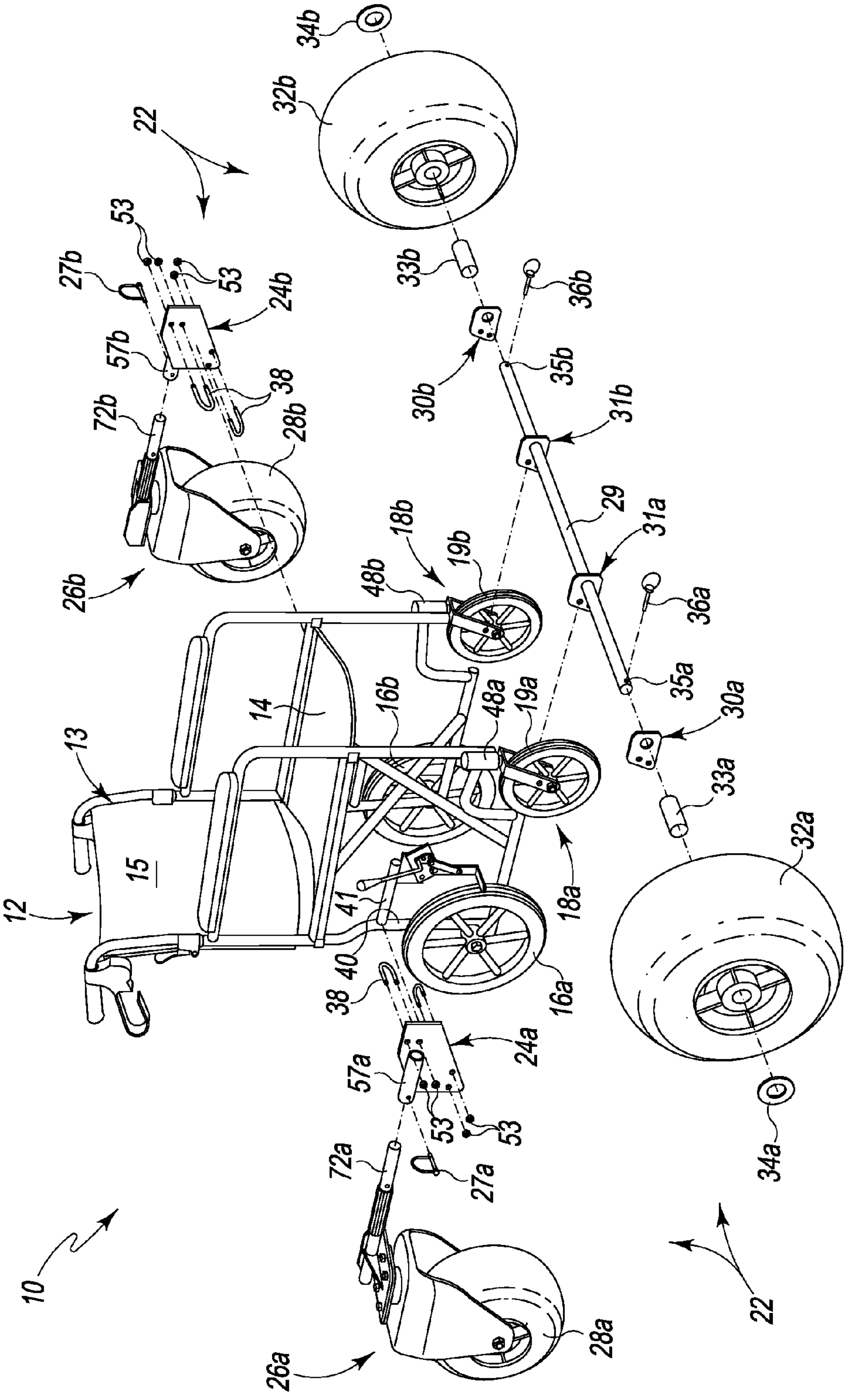
FIG. 1 is a perspective view of a portable wheelchair convertible between a portable conventional or street wheelchair and a portable specialty wheelchair, with specialty wheelchair components for converting the street wheelchair into a beach wheelchair shown in exploded view relative to the street wheelchair.
Figure 2:
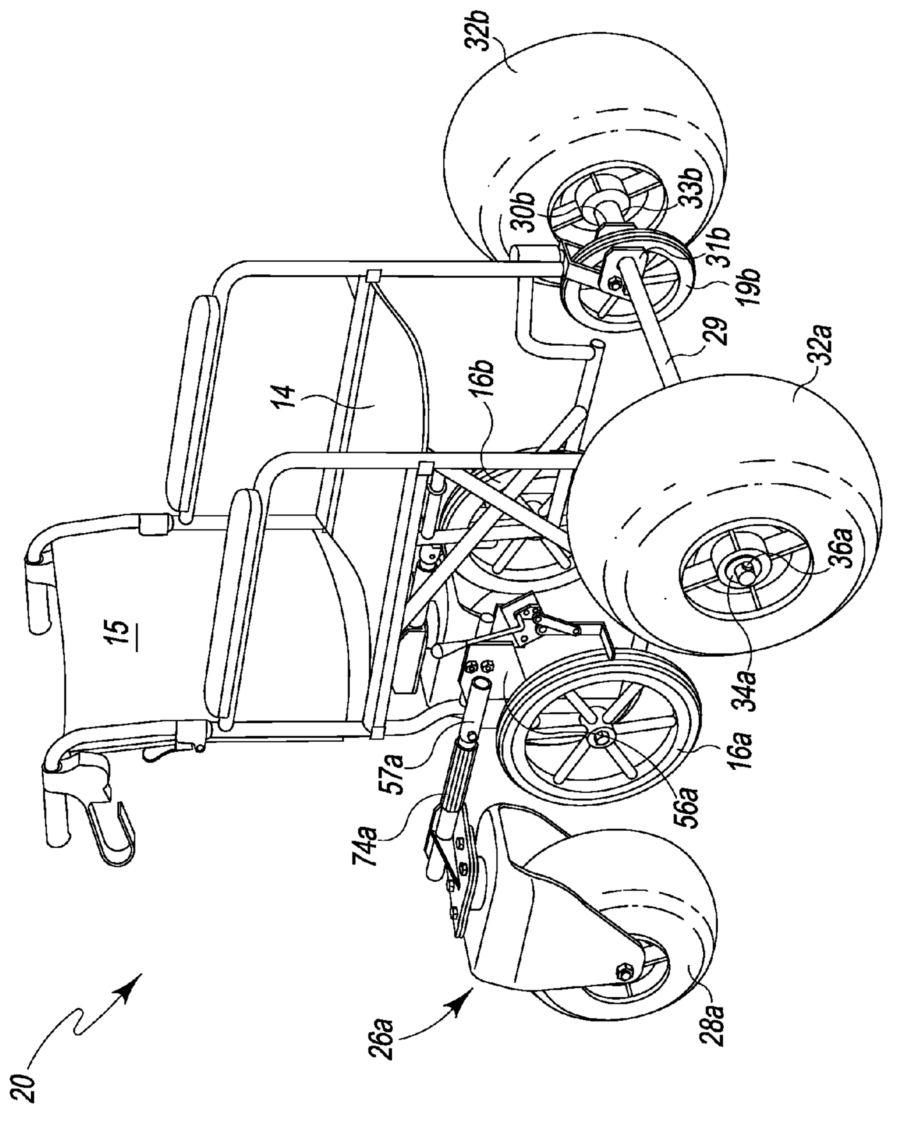
FIG. 2 is a perspective view of the portable wheelchair of FIG. 1 converted into a beach wheelchair via the beach conversion components.

Referring to FIGS. 1 and 2, there is shown a portable convertible wheelchair, generally designated 10, that is convertible between a portable conventional or street wheelchair 12 (see FIG. 1) and a portable specialty wheelchair, in accordance with the principles of the present invention. The specialty wheelchair in this case is a beach wheelchair 20 when specialty conversion components or parts 22 are made part of and/or installed on the wheelchair 12. The wheelchair 12 has a lightweight frame 13 that is preferably, but not necessarily, foldable. The frame 13 supports a seat 14 and a back 15, brake assembly 80 (see e.g., FIG. 6), as well as armrests, user hand holds, hand brakes, and other typical wheelchair elements shown and not shown. According to the present principles, all of the wheelchairs herein are portable and preferably, but not necessarily, foldable to aid in portability.

The frame 13 rotatably supports a first rear wheel 16*a* on one side of the frame 13 and a second rear wheel 16*b* on another side of the frame 13. A first front wheel assembly 18*a* is pivotally coupled to the frame 13 at one side thereof via a first pivot boss or support structure 48*a* and a second front wheel assembly 18*b* coupled to the frame at another side thereof via a second pivot boss or support structure 48*b*. It should be appreciated that the nomenclature first and second (or like language) is arbitrary for both the aforementioned and below mentioned components or parts. The frame 13 is also foldable in a conventional manner.

The specialty conversion components 22 (shown in exploded view) of the convertible wheelchair 10 are particularly for conversion between the street wheelchair 12 and the beach wheelchair 20 (as shown in FIG. 2). While shown in exploded view, some of the specialty conversion components 22 are preferably, but not necessarily, pre-mounted or installed on the wheelchair 12. For instance, a first rear conversion bracket 24*a* is attached to frame members 40 and 41 via threaded U-bolts 38 and nuts 53 at a first rear side of the frame, while a second rear conversion bracket 24*b* is attached to like frame members via threaded bolts 38 and nuts 53 at a second rear side of the frame. The first and second rear conversion brackets 24*a*, 24*b* each support a rear wheel conversion assembly 26*a*, 26*b* that both support the back end of the wheelchair. Also, a first front conversion bracket pair 30*a*, 31*a* is attached to opposite sides of the first front wheel assembly 18*a*, while a second front conversion bracket pair 30*b*, 31*b* is attached to opposite sides of the second front wheel assembly 18*b*. The first and second front conversion bracket pairs are configured to support an axle 29 of the beach conversion components 22 which, in turn, supports a first front conversion tire 32*a* and a second front conversion tire 32*b* that both support the front end of the wheelchair. Other specialty conversion components 22 are temporarily installed on the wheelchair 12 when specialty conversion is desired.

Figure 4:
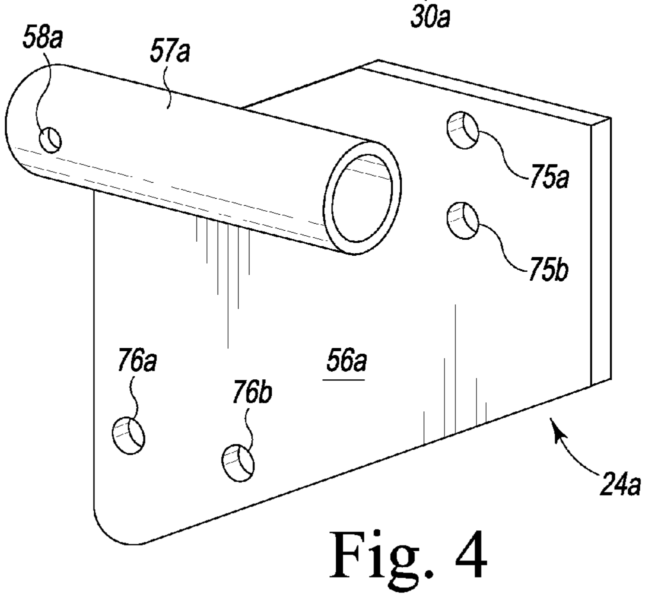
FIG. 4 is an enlarged perspective view of a rear wheel bracket of the beach conversion components for a rear wheel assembly of the beach conversion parts.

As illustrated in FIG. 1, the first and second rear wheel conversion brackets 24*a* and 24*b* are mounted to the frame 13 via U-bolts 38 and nuts 53 and are configured to support the rear wheel conversion assemblies 26*a*, 26*b*. Of course, other manners of attaching the brackets may be used. As best seen in FIG. 4, the first rear wheel conversion bracket 24*a* is depicted in greater detail, it being understood that the second rear wheel conversion bracket 24*b* is the same but reversed in configuration. The rear wheel conversion bracket 24*a* is characterized by a plate 56*a* having a first pair of bores 75*a*, 75*b* that allows the legs of a U-bolt 38 to extend therethrough, and a second pair of bores 76*a*, 76*b* that allows the legs of a U-bolt 38 to extend therethrough. A tube 57*a* is mounted to the plate 56*a* and includes a bore 58*a* that extends through both sides of the tube 57*a*. The tube 57*a* is mounted to the plate 56*a* such that the opening of the tube 57*a* is essentially parallel to the ground.

Figure 6:
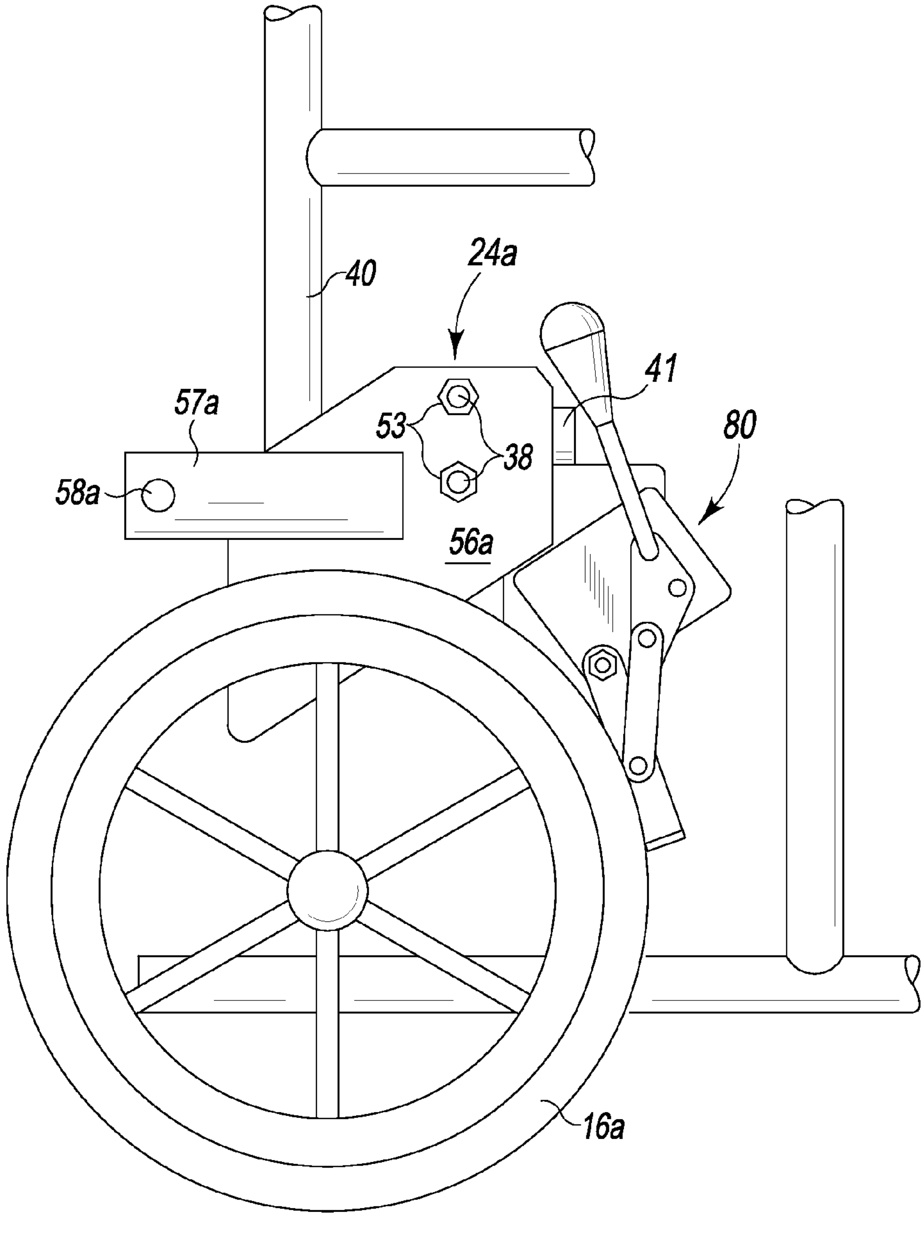
FIG. 6 is an enlarged perspective side view of a rear portion of the present convertible wheelchair showing placement of the rear wheel bracket of the beach conversion components as shown in FIG. 4 onto the wheelchair.
Figure 7:
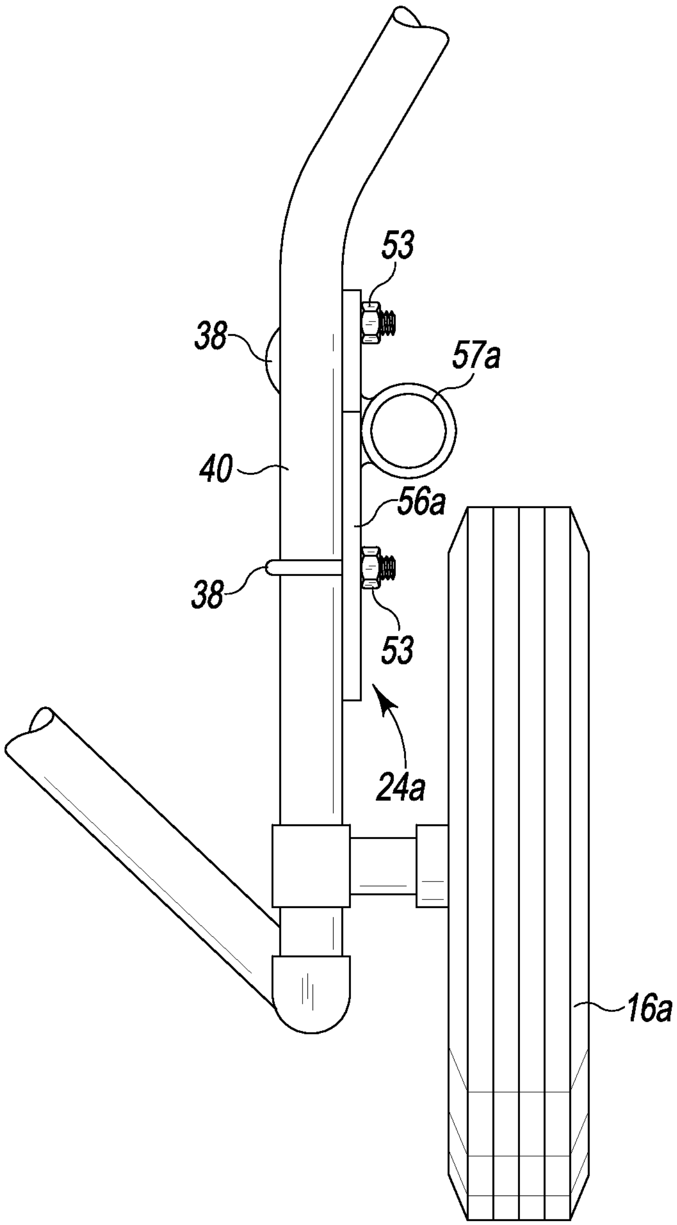
FIG. 7 is an enlarged perspective rear view of the rear portion of the present convertible wheelchair showing a manner of attachment of the rear wheel bracket of the beach conversion components to the wheelchair.

Referring to FIGS. 6 and 7, the first rear wheel beach conversion bracket 24*a* is shown mounted to the frame members 40, 41 of the frame 13 of the wheelchair 12. U-bolts 38 are shown mounting the plate 56*a* to the frame members 40, 41 via nuts 53. The plate 56*a* thereof is mounted to the frame members 40, 41 such that the tube 57*a* is above the first rear wheel 16*a* of the wheelchair 12 or otherwise oriented such that when installed, the first rear wheel conversion assembly 26*a* lifts the first rear wheel 16*a* off the ground. The tube 57*a* is sized to receive an arm 72*a* of the first rear wheel conversion assembly 26*a*. The arm 72*a* and thus the first rear wheel conversion assembly 56*a* is releasably held to the tube 57*a* via a D-pin 27*a* that extends through the bore 58*a* in the tube 57*a* and a bore 73*a* in the arm 72*a* of the first rear wheel conversion assembly 26*a*.

Figure 8:
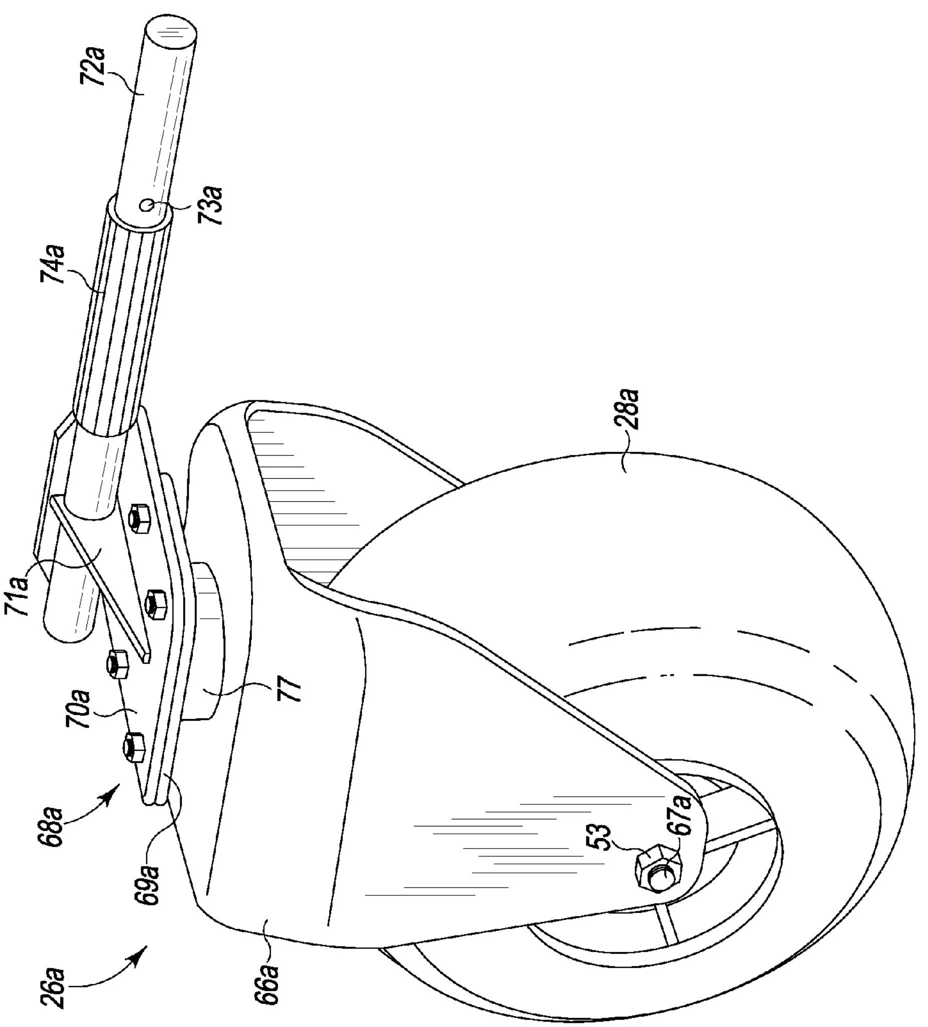
FIG. 8 is an enlarged view of a rear wheel assembly of the beach conversion components.

The first rear wheel conversion assembly 26*a* is depicted in greater detail in FIG. 8, it being understood that the second rear wheel conversion assembly 26*b* is the same. The first rear wheel conversion assembly 26*a* has an oversized, low pressure tire 28*a* mounted on an axle 67 that is supported by a yoke 66*a*. A stem 77 is rotatably mounted to and extends vertically from the yoke 66*a* to a connection assembly 68*a*. The yoke 66*a* is thus attached to the stem 77 such that the yoke 66*a* and thus the tire 28*a* can swivel or rotate about the connection assembly 68*a*. The stem 77 is particularly connected to a lower plate 69*a* of the connection assembly 68*a* which, in turn, is connected to an upper plate 70*a* of the connection assembly 68*a*. The upper plate 70*a* has a flange 71*a* that supports a handle 74*a* and arm 72*a*. The arm 72*a* has a bore 73*a* that aligns with the bore 58*a* of the tube 57*a* of the rear conversion bracket 24*a* and which receives the D-pin 27*a* when the arm 72*a* is inserted into the tube 57*a*. Each rear wheel conversion assembly 26 is thus easily attachable then detachable from the bracket 24. In this manner, rear beach conversion wheels are easily attached that elevate the rear wheels of the street wheelchair 12 and provide tires that allow use on all types and terrains of beaches.

Figure 3:
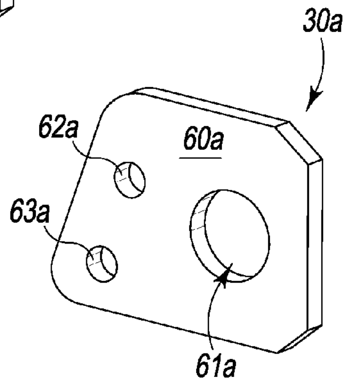
FIG. 3 is an enlarged perspective view of a front wheel bracket of the beach conversion components for attachment onto the front wheel assembly of the wheelchair.

As indicated above, the first front conversion bracket pair 30*a*, 31*a* is attached to the first front wheel assembly 18*a*, while the second front conversion bracket pair 30*b*, 31*b* is attached to the second front wheel assembly 18*b* in order to support the axle 29. As seen in FIG. 3, the front conversion bracket 30*a* is shown in greater detail and discussed below, it being understood that all of the front conversion brackets 30, 31 are the same. The front conversion bracket 30*a* is characterized by a plate 60*a* having a pair of bores 62*a*, 62*b* that allows the bolts 53 and 54 to extend therethrough, retained by nuts 53. A bore 61*a* is provided adjacent the bores 62*a*, 62*b* and is sized to receive the axle 29.

Figure 5:
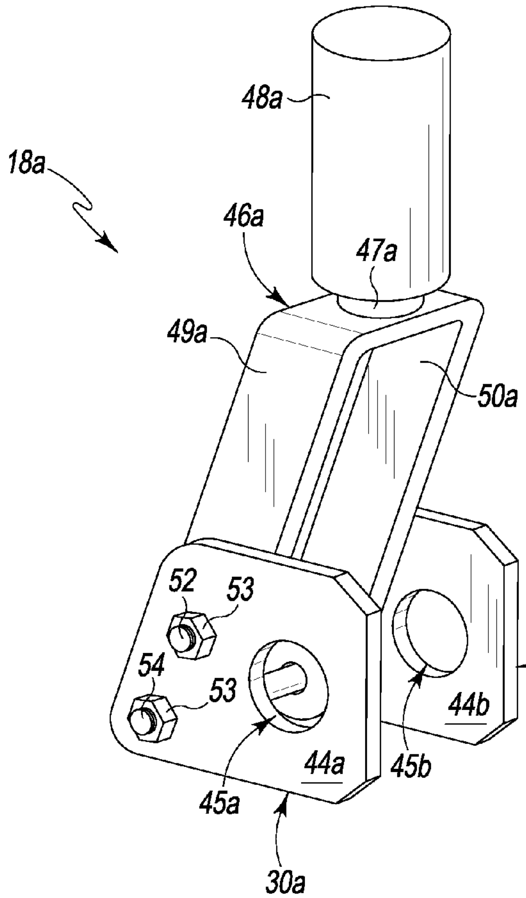
FIG. 5 is an enlarged perspective view of a front wheel assembly of the present convertible wheelchair with the front wheel brackets of the beach conversion components as shown in FIG. 3 mounted thereon.

Referring to FIG. 5, the pair of front wheel beach conversion brackets 30*a*, 31*a* is shown attached to the yoke 46*a* of the first front wheel assembly 18*a*. Particularly, the front wheel beach conversion bracket 30*a* is mounted to an outside surface of a leg 49*a* of the yoke 46*a* while the front wheel beach conversion bracket 31*a* is mounted to an outside surface of a leg 50*a* of the yoke 46*a*. The front wheel beach conversion bracket 30*a* is particularly retained on the leg 49*a* via a bolt 52 and nut 53 associated with the upper bore 62*a* of the plate 60*a*, and a front wheel axle 54 and nut 53 associated with the lower bore 62*b* of the plate 60*a*. The axle 54 extends through and spans the front wheel beach conversion brackets 30*a*, 31*a* to hold the front tire 19*a* (not shown in FIG. 5). The front wheel beach conversion bracket 31*a* is attached to the leg 50*a* of the yoke 46*a* by a bolt and nut (not shown) extending through the appropriate bores of the plate 60*a*. The yoke 46*a* is connected to a stem 47*a* that is received in the pivot boss 48*a*.

As best illustrated in FIG. 1, the front tires 32*a*, 32*b* are situated on the axle 29 that is retained by front wheel beach conversion bracket pairs 30, 31. The axle 29 also extends through the front wheels 19*a*, 19*b*. In order to provide adequate spacing between the tire 32*a* and the front wheel beach conversion bracket 30*a*, a sleeve 33*a* is provided that fits over the end of the axle 29 between the tire 32*a* and the front wheel beach conversion bracket 30*a*. Likewise, in order to provide adequate spacing between the tire 32*b* and the front wheel beach conversion bracket 30*b*, a sleeve 33*b* is provided that fits over the end of the axle 29 between tire 32*b* and the front wheel beach conversion bracket 30*b*. A washer 34*a* is provided over the end of the axle 29 as it projects beyond the hub of the tire 32*a*. A pin 36*a* is received in a bore 35*a* in the axle proximate the end thereof, in order to retain the washer 34*a* and tire 32*a* on the axle 29. Likewise, a washer 34*b* is provided over the end of the axle 29 as it projects beyond the hub of the tire 32*b*. A pin 36*b* is received in a bore 35*b* in the axle proximate the end thereof, in order to retain the washer 34*b* and tire 32*b* on the axle 29. With the tires 32*a*, 32*b* installed on the axle 29, the front wheels 19*a*, 19*b* of the wheelchair 12 are elevated from the ground. The tires 32*a*, 32*b* allow use on all types and terrains of beaches.

Disassembly and/or conversion of the beach wheelchair 20 into the street wheelchair 12 is accomplished by removing the two rear wheel assemblies 26*a*, 26*b*, the two front tires 32*a*, 32*b*, axle 29, washers 34*a*, 34*b* and bushings 33*a*, 33*b*. For the two rear wheel assemblies 26*a*, 26*b*, a removal of the D-pins 27*a*, 27*b* from the tube 57 of the respective rear conversion plate 24 and from arm 72*a*, 72*b* of the respective rear wheel assemblies 26*a*, 26*b*, releases the respective arms that allows removal of the rear wheel assembly. For the two front tires 32*a*, 32*b*, the pins 36*a*, 36*b* are removed from the axle 29 allowing the washers 34*a*, 34*b*, the tires 32*a*, 32*b*, and the bushings 33*a*, 33*b* to be removed from the axle 29. Thereafter, the axle 29 is removed from the bracket pairs 30*a*, 31*b* and 30*b*, 31*b*.

Figure 11:
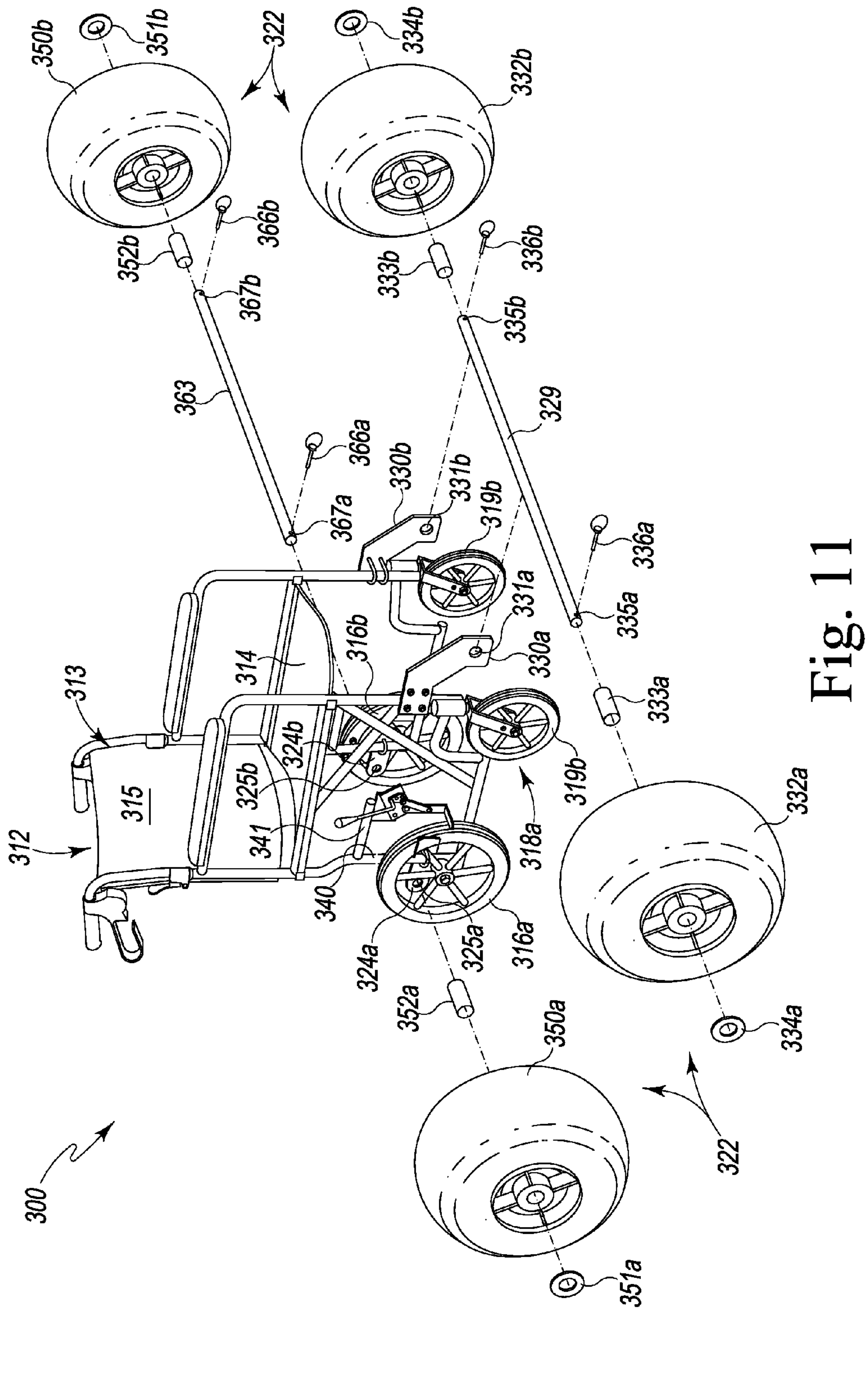
FIG. 11 is a perspective view of a portable wheelchair convertible between a conventional or street wheelchair and a specialty wheelchair, with specialty wheelchair components for converting the street wheelchair into a beach wheelchair shown in exploded view relative to the street wheelchair.

Referring now to FIG. 11, there is depicted another embodiment of a portable convertible wheelchair, generally designated 300, that is convertible between a portable conventional or street wheelchair 312 and a portable specialty wheelchair, in accordance with the present principles, wherein the specialty wheelchair is a beach wheelchair. The street wheelchair 312 includes at least substantially the same features and parts as the street wheelchair of FIGS. 1 and 2 and, as such, has corresponding parts that are numbered in the 300's whose tens and digit places correspond to the corresponding part on the wheelchair 12 of FIGS. 1 and 2. These corresponding parts will not be discussed in detail.

The portable convertible wheelchair 300 includes specialty conversion components 322 (shown in exploded view) particularly for conversion between the street wheelchair 312 and a beach wheelchair. It should be appreciated, like the wheelchair 12 of FIGS. 1 and 2, some of the specialty conversion components 322 are preferably, but not necessarily, pre-mounted or installed on the wheelchair 312. For instance, a first front conversion bracket 330*a* is attached to a first front frame member of the frame 313 via threaded U-bolts and nuts, while a second front conversion bracket 330*b* is attached to a second frame member of the frame 313 via threaded bolts and nuts. The first and second front conversion brackets 330*a*, 330*b* are thus attached to opposite sides of the front frame. The first and second front conversion brackets 330*a*, 330*b* are configured to support an axle 329 of the beach conversion components 322 which, in turn, supports a first front conversion tire 332*a* adjacent the first side of the frame 313 and a second front conversion tire 332*b* adjacent the second side of the frame 313, that both support the front end of the wheelchair 300.

When the portable convertible wheelchair is a beach wheelchair, a front axle 329 of the beach conversion components 322 is supported by the first and second front conversion brackets 330*a*, 330*b*. The first front conversion bracket 330*a* has a bore 331*a*, while the second front conversion bracket has a bore 331*b*. The bores 331*a*, 331*b* are aligned such that the front axle 329 can extend through the bores 331*a*, 331*b*. The front tires 332*a*, 332*b* are situated on the front axle 329 laterally outside the front conversion brackets 330*a*, 330*b*. In order to provide adequate spacing between the tire 332*a* and the first front wheel beach conversion bracket 330*a*, a sleeve 333*a* is provided that fits over the end of the front axle 329 between the tire 332*a* and the first front wheel beach conversion bracket 330*a*. Likewise, in order to provide adequate spacing between the tire 332*b* and the second front wheel beach conversion bracket 330*b*, a sleeve 333*b* is provided that fits over the end of the front axle 329 between the tire 332*b* and the second front wheel beach conversion bracket 330*b*. A washer 334*a* is provided over the end of the front axle 329 as it projects beyond the hub of the tire 332*a*. A pin 336*a* is received in a bore 335*a* in the front axle 329 proximate the end thereof, in order to retain the washer 334*a* and the tire 332*a* on the front axle 329. Likewise, a washer 334*b* is provided over the end of the front axle 329 as it projects beyond the hub of the tire 332*b*. A pin 336*b* is received in a bore 335*b* in the front axle 329 proximate the end thereof, in order to retain the washer 334*b* and the tire 332*b* on the front axle 329. With the tires 332*a*, 332*b* installed on the front axle 329, the front wheels 319*a*, 319*b* of the wheelchair 312 are elevated from the ground. The tires 332*a*, 332*b* allow use on all types and terrains of beaches.

Additionally, when the portable convertible wheelchair is a portable beach wheelchair, a rear axle 363 of the beach conversion components 322 is supported by the first and second rear conversion brackets 324*a*, 324*b*. The first rear conversion bracket 324*a* has a bore 325*a*, while the second rear conversion bracket has a bore 325*b*. The bores 325*a*, 325*b* are aligned such that the rear axle 363 can extend through the bores 324*a*, 324*b*. The rear tires 350*a*, 350*b* are situated on the rear axle 363 laterally outside the rear conversion brackets 324*a*, 324*b*. In order to provide adequate spacing between the tire 350*a* and the first rear wheel beach conversion bracket 324*a*, a sleeve 352*a* is provided that fits over the end of the rear axle 363 between the tire 350*a* and the first rear wheel beach conversion bracket 324*a*. Likewise, in order to provide adequate spacing between the tire 350*b* and the second rear wheel beach conversion bracket 324*b*, a sleeve 352*b* is provided that fits over the end of the rear axle 363 between the tire 350*b* and the second rear wheel beach conversion bracket 324*b*. A washer 351*b* is provided over the end of the rear axle 363 as it projects beyond the hub of the tire 350*b*. A pin 366*a* is received in a bore 367*a* in the rear axle 363 proximate the end thereof, in order to retain the washer 351*a* and the tire 350*a* on the rear axle 363. Likewise, a washer 351*b* is provided over the end of the rear axle 363 as it projects beyond the hub of the tire 350*b*. A pin 366*b* is received in a bore 367*b* in the rear axle 363 proximate the end thereof, in order to retain the washer 351*b* and the tire 350*b* on the rear axle 363. With the tires 350*a*, 350*b* installed on the rear axle 363, the rear wheels 316*a*, 316*b* of the wheelchair 312 are elevated from the ground. The tires 350*a*, 350*b* allow use on all types and terrains of beaches.

Figure 13:
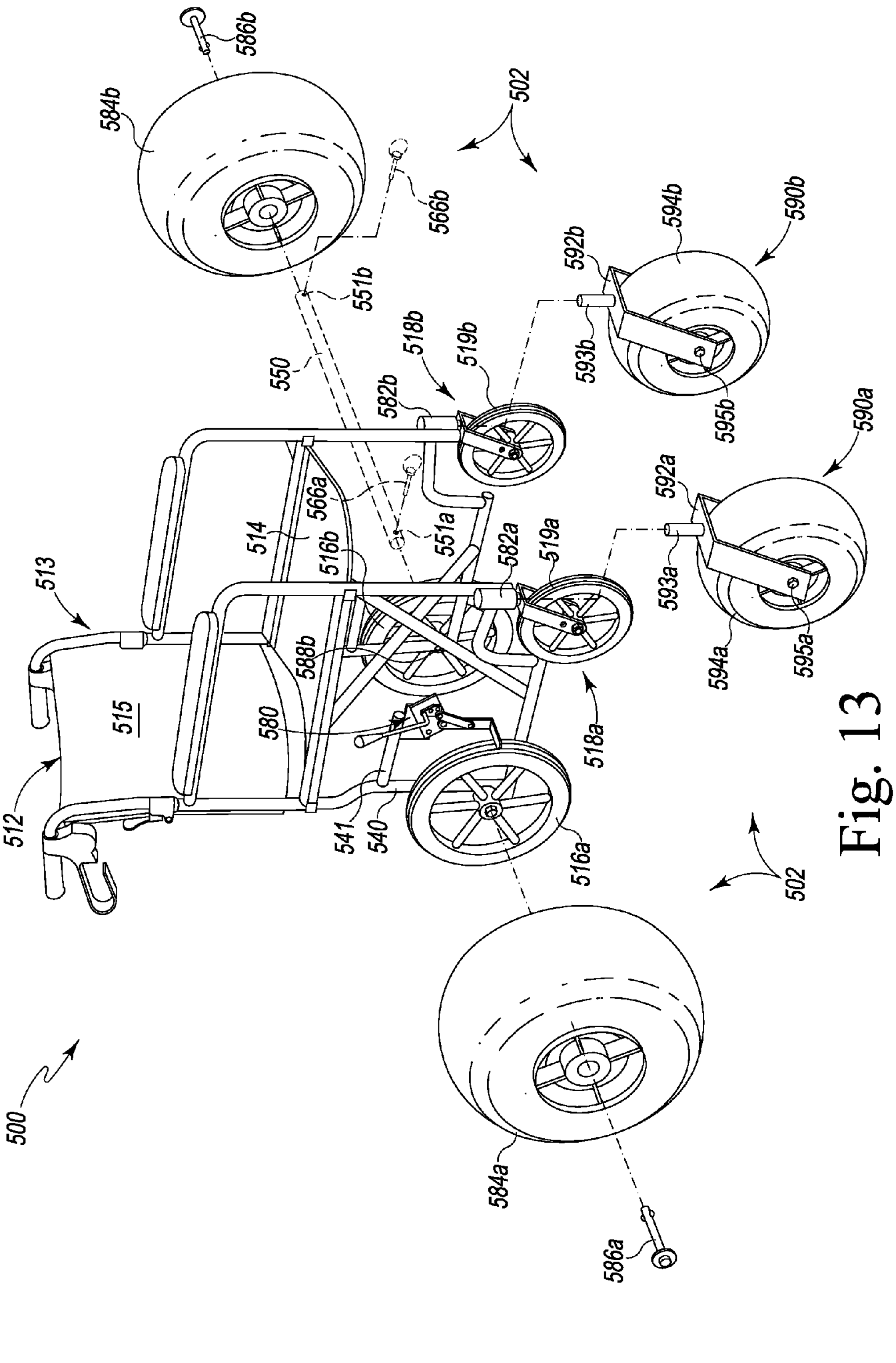
FIG. 13 is a perspective view of a portable wheelchair convertible between a conventional or street wheelchair and a specialty wheelchair, with specialty wheelchair components for converting the street wheelchair into a beach shown in exploded view relative to the street wheelchair Like reference numerals indicate the same or similar parts throughout the figures.

Referring now to FIG. 13, there is depicted another embodiment of a portable convertible wheelchair, generally designated 500, that is convertible between a portable conventional or street wheelchair 512 and a portable specialty wheelchair, in accordance with the present principles, wherein the specialty wheelchair is a beach wheelchair. The street wheelchair 512 includes at least substantially the same features and parts as the street wheelchair of FIGS. 1 and 2 and, as such, has corresponding parts that are numbered in the 500's whose tens and digit places correspond to the corresponding part on the wheelchair 12 of FIGS. 1 and 2. These corresponding parts will not be discussed in detail.

The portable convertible wheelchair 500 includes specialty conversion components 502 (shown in exploded view) particularly for conversion between the portable street wheelchair 512 and a portable beach wheelchair, the portable beach wheelchair having a standard duty conversion version and a heavy duty conversion version. In this embodiment, the portable beach conversion components 502 utilize existing frame, supports, support structures, and/or attachment structures of the street wheelchair 512.

The conversion components 502 has a first front wheel assembly 590*a* and a second front wheel assembly 590*b*. The first front wheel assembly 590*a* is configured to replace the existing first front wheel assembly 518*a* while the second front wheel assembly 590*b* is configured to replace the existing second front wheel assembly 518*b*. Particularly, the first front wheel assembly 590*a* is configured for pivotal reception in the existing boss, pivot structure or support 582*a* of the frame 513. Likewise, the second front wheel assembly 590*b* is configured for pivotal reception in the existing boss, pivot structure or support 582*b* of the frame 513. As such, the first front wheel assembly 590*a* includes a robust yoke 592*a* extending about and rotatably supporting a low pressure tire 594*a* via an axle 595*a*, the low pressure tire 594*a* being smaller in diameter than the first rear tire 584*a*. A stem 593*a* extends from the yoke 592*a* that fits into the pivot bosses 582*a*. Likewise, the second front wheel assembly 590*b* includes a robust yoke 592*b* extending about and rotatably supporting a low pressure tire 594*b* via an axle 595*b*, the low pressure tire 594*b* being smaller in diameter than the second rear tire 584*b*. A stem 593*b* extends from the yoke 592*b* that fits into the pivot bosses 582*b*.

In the standard duty conversion version, the conversion components include a first rear large low pressure tire 584*a* and a second rear large low pressure tire 584*b* and corresponding quick release pins 586*a*, 586*b*. Quick release pins 586*a* and 586*b* may be Sky-Loc™ Button-Handle pins such as those manufactured by Big Sky Precision, Inc. of Manhattan, Mont. The first rear large low pressure tire 584*a* can be substituted for the existing first rear wheel 516*a* (the preferred mode) or may be installed adjacent to the existing first rear wheel 516*a*. In both cases, the quick release pin 586*a* attaches the first rear large low pressure tire 584*a* to the frame after the existing first rear wheel axle is removed. The second rear large low pressure tire 584*b* can also be substituted for the existing second rear wheel 516*b* (the preferred mode) or may be installed adjacent to the existing second rear wheel 516*b*. In both cases, the quick release pin 586*b* attaches the second rear large low pressure tire 584*b* to the frame after the existing second rear wheel axle is removed. Other manners or methods of providing quick release may be used such as thumb screws, wing nuts, knobs or the like.

In the heavy duty conversion version, the conversion components 502 do not utilize the quick release pins 586*a*, 586*b* to attach the first and second rear low pressure wheels 584*a*, 584*b* to the frame, but includes a rear axle 550 (shown in dashed line to represent an alternate conversion components version) that is supported through the existing axle bores of the frame 513 that support the first and second existing wheels 516*a* and 516*b* of the portable street wheelchair 512. The first rear large low pressure tire 584*a* is received over an end of the rear axle 550 that extends beyond the first rear wheel 516*a* in the case where the first rear wheel 516*a* remains on the wheelchair or extends beyond the rear frame where the wheelchair is sans the first rear wheel 516*a*. A pin 566*a* (shown in dashed line to represent an alternate conversion components version) extends through a bore 551*a* in the end of the axle 550. The second rear large low pressure tire 584*b* is received over an end of the rear axle 550 that extends beyond the second rear wheel 516*b* in the case where the second rear wheel 516*b* remains on the wheelchair or extends beyond the rear frame where the wheelchair is sans the second rear wheel 516*b*. A pin 566*b* (shown in dashed line to represent an alternate conversion components version) extends through a bore 551*b* in the end of the axle 550. Again, other manners or methods of providing quick release may be used such as thumb screws, wing nuts, knobs or the like.

As indicated above, the present portable convertible wheelchair converts between a conventional or street wheelchair and a specialty wheelchair. In the versions shown in FIGS. 1-8, 11 and 13, the specialty wheelchair is a beach wheelchair. In the versions shown in FIGS. 9-10, and 12, described below, the specialty wheelchair is an all-terrain wheelchair or trail chair.

Figure 9:
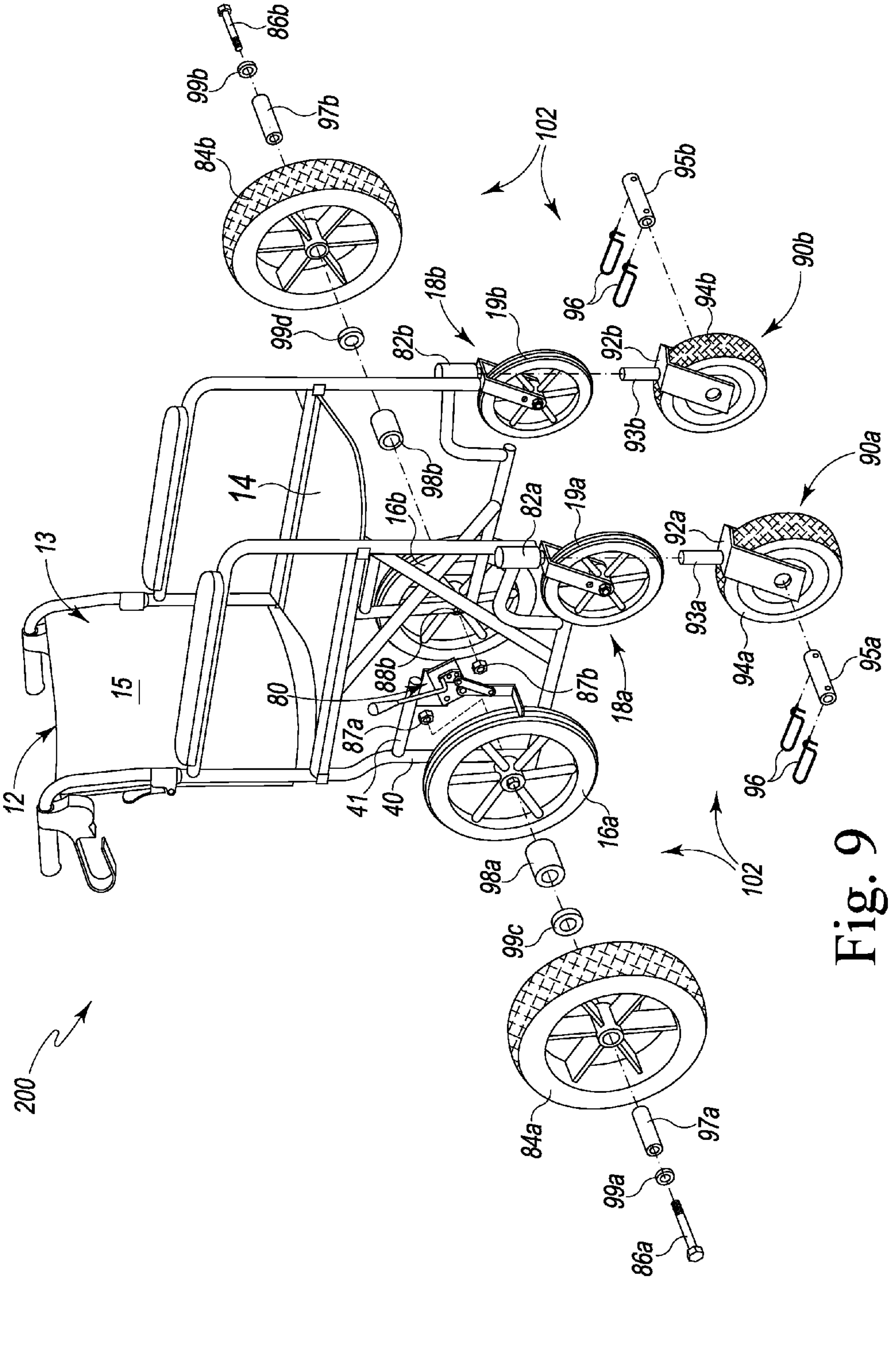
FIG. 9 is a perspective view of a portable wheelchair convertible between a conventional or street wheelchair and a specialty wheelchair, with specialty wheelchair components for converting the street wheelchair into an all-terrain wheelchair shown in exploded view relative to the street wheelchair.
Figure 10:
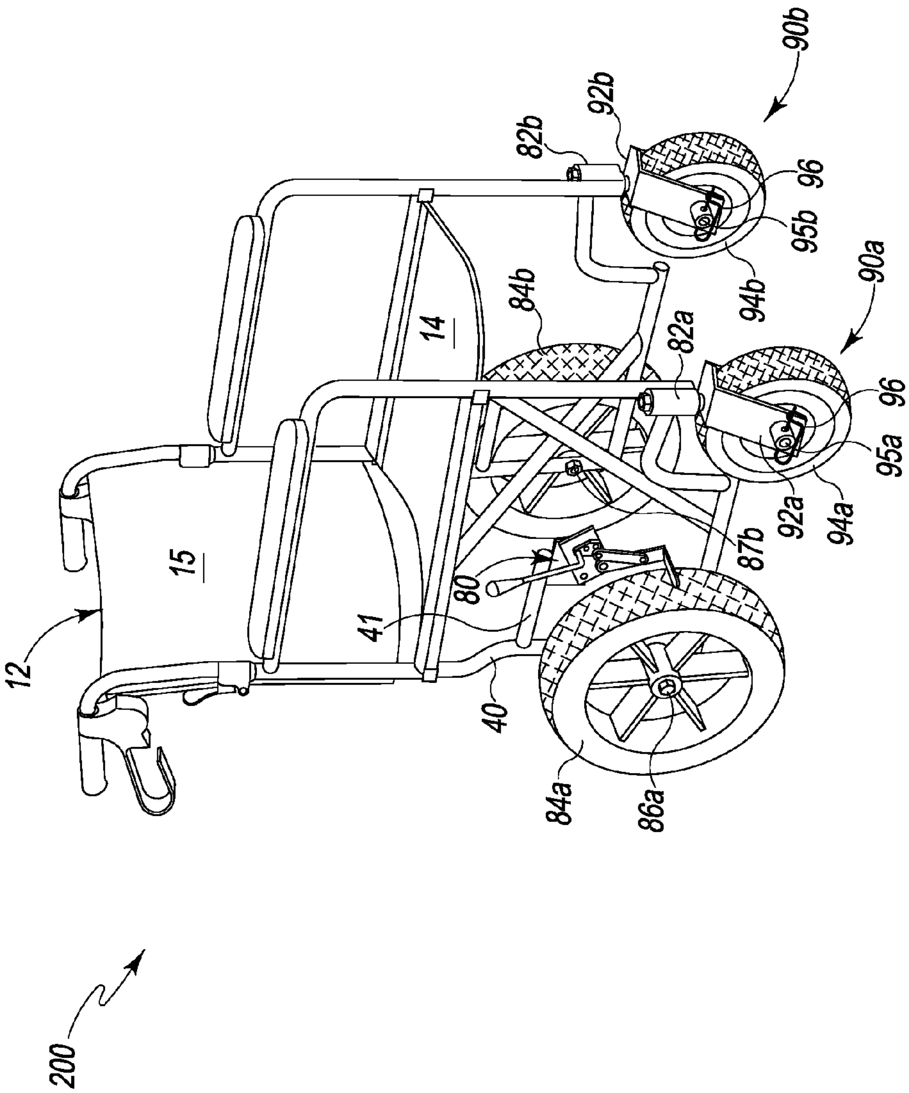
FIG. 10 is a perspective view of the wheelchair of FIG. 9 converted into the all-terrain wheelchair via the all-terrain conversion components.

Referring now to FIGS. 9 and 10, there is shown a portable convertible wheelchair, generally designated 200 fashioned in accordance with the present principles, that is convertible between a portable conventional or street wheelchair 12 (see FIG. 1) and a portable specialty wheelchair, which in this case, is an all-terrain wheelchair or trail chair 200 when specialty conversion components 102 are made part of and/or installed on the wheelchair 12. The wheelchair 12 has a lightweight frame 13 that is preferably, but not necessarily, foldable. The frame 13 supports a seat 14 and a back 15, brake assembly 80, as well as armrests, user hand holds, hand brakes, and other typical wheelchair elements shown and not shown such as that described with respect to the wheelchair 12 of FIG. 1.

The all-terrain conversion components 102 include first and second rear tires 84*a*, 84*b* with associated first and second axle bolts 86*a*, 86*b* and nuts 87*a*, 87*b*, and first and second front wheel assemblies 90*a*, 90*b*. The first and second rear tires 84*a*, 84*b* can either be connected adjacent to or replace the first and second rear street wheels 16*a*, 16*b* and their associated axles/axle bolt and nuts. The rear all-terrain tires 84*a*, 84*b* have a wider tread than the first and second rear street wheels 16*a*, 16*b* and are more robust than the first and second street wheels 16*a*, 16*b*. In the case where the first and second rear tires 84*a*, 84*b* replace the first and second rear wheels 16*a*, 16*b*, the first and second rear tires 84*a*, 84*b* have a diameter that is greater than the diameter of the first and second rear wheels 16*a*, 16*b*. In both cases, the first rear tire 84*a* is coupled to a rear frame member via a first rear axle bolt 86*a*. The first rear axle bolt 86*a* extends through a washer 99*a* and a sleeve 97*a* that is received in the hub of the tire 84*a*. A tubular spacer 98*a* and washer 99*c* are provided between the inside of the tire 84*a* and the rear frame member or the existing first rear wheel 16*a*. The first rear axle bolt 86*a* likewise extends through these conversion components while a nut 87*a* is received on the threaded end of the bolt 86*a* that extends through the rear frame member. A wing nut, knob or other securing means may be used in place of the nut 87*a*.

Likewise, in both cases, the second rear tire 84*b* is coupled to a rear frame member via a second rear axle bolt 86*b*. The second rear axle bolt 86*b* extends through a washer 99*b* and a sleeve 97*b* that is received in the hub of the tire 84*b*. A tubular spacer 98*b* and washer 99*d* are provided between the inside of the tire 84*b* and the rear frame member or the existing second rear wheel 16*a*. The second rear axle bolt 86*b* likewise extends through these conversion components while a nut 87*b* is received on the threaded end of the bolt 86*b* that extends through the rear frame member. A wing nut, knob or other securing means may be used in place of the nut 87*b*.

The first and second front all-terrain wheel assemblies 90*a*, 90*b* of the conversion components 102 replace the first and second front street wheel assemblies 18*a*, 18*b* of the street wheelchair. The first and second front all-terrain wheel assemblies 90*a*, 90*b* each have a respective robust yoke 92*a*, 92*b* supporting a wider, more robust all-terrain or trail front tire 94*a*, 94*b*. A stem 93*a*, 93*b* extends from the respective yoke 92*a*, 92*b* that fits into the respective existing pivot bosses, supports or structures 82*a*, 82*b* of the frame 13, the pivot bosses being existing front wheel supports or structures. The first front all-terrain tire 94*a* is rotatably connected to the yoke 92*a* via a first front wheel assembly axle 95*a*. Clip pins 96, attachable to ends of the axle 95*a* that extend beyond arms of the yoke 92*a*, retain the first front tire 94*a* on the yoke 92*a*. Likewise, the second front all-terrain tire 94*b* is rotatably connected to the yoke 92*b* via a second front wheel assembly axle 95*b*. Clip pins 96, attachable to ends of the axle 95*b* that extend beyond arms of the yoke 92*b*, retain the second front tire 94*b* on the yoke 92*b*.

During conversion from the street wheelchair 12 to the all-terrain wheelchair 200, the first and second rear street wheels 16*a*, 16*b* and their axles are removed and replaced with the present first and second rear all-terrain wheels 84*a*, 84*b* and axles 86*a*, 86*b* of the all-terrain conversion components 102. The first and second front wheel assemblies 18*a*, 18*b* are removed and replace with the present first and second front all-terrain wheel assemblies 90*a*, 90*b* of the all-terrain conversion components 102. Conversion from the all-terrain wheelchair 200 to the street wheelchair 12 is accomplished by replacing the first and second front wheel assemblies 90*a*, 90*b* with the first and second front wheel assemblies 18*a*, 18*b* and the first and second rear tires 84*a*, 84*b* with the first and second rear wheels 16*a*, 16*b*. It can be appreciated that the all-terrain conversion components 102 provide an all-terrain wheelchair from a street wheelchair that can easily navigate off-road terrain.

Figure 12:
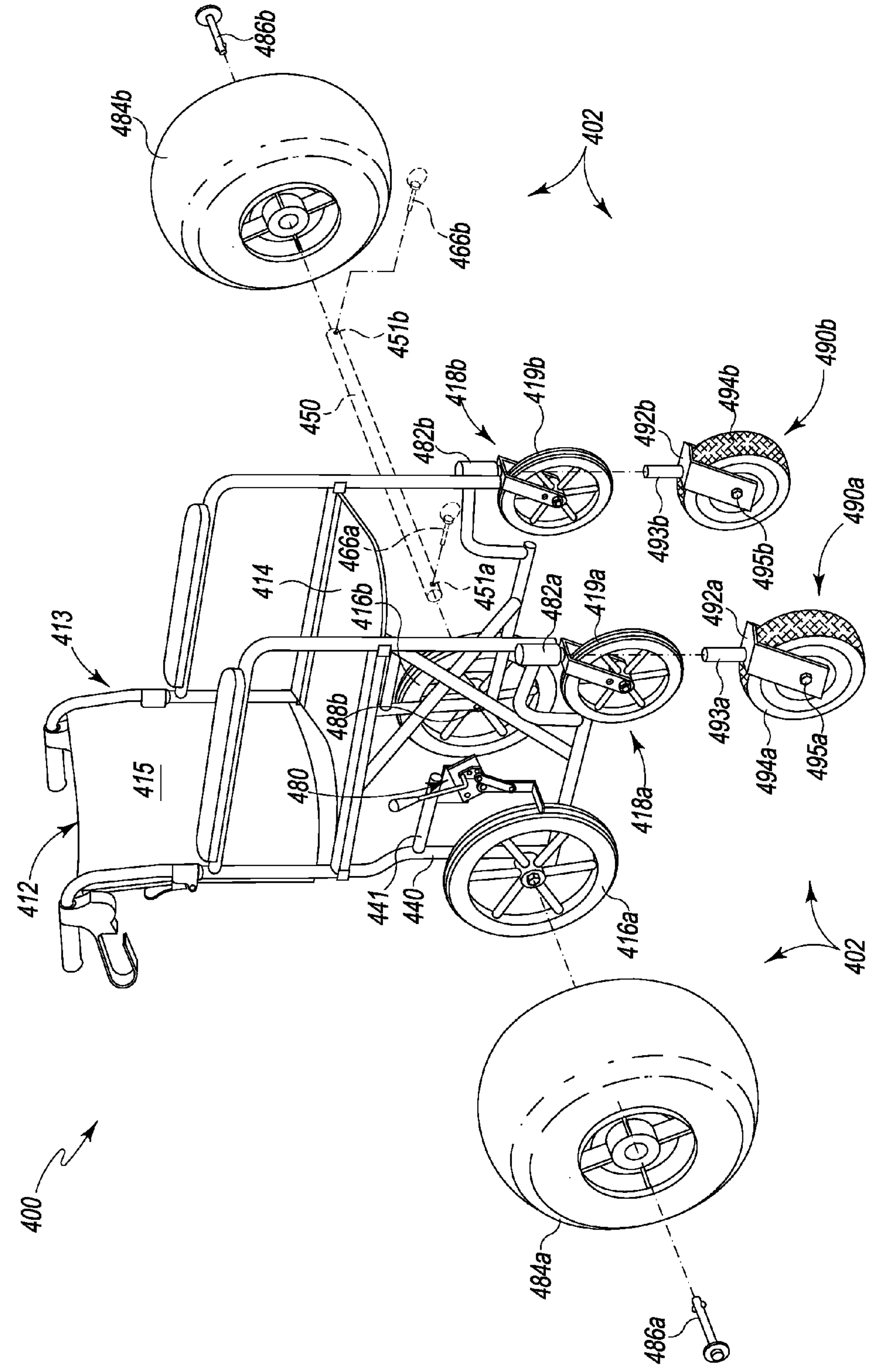
FIG. 12 is a perspective view of a portable wheelchair convertible between a conventional or street wheelchair and a specialty wheelchair, with specialty wheelchair components for converting the street wheelchair into a all-terrain or trail wheelchair shown in exploded view relative to the street wheelchair.

Referring now to FIG. 12, there is depicted another embodiment of a portable convertible wheelchair, generally designated 400, that is convertible between a portable conventional or street wheelchair 412 and a portable specialty wheelchair, in accordance with the present principles, wherein the specialty wheelchair is an all-terrain or trail wheelchair the portable beach wheelchair having a standard duty conversion version and a heavy duty conversion version. The portable street wheelchair 412 includes at least substantially the same features and parts as the street wheelchair of FIGS. 1 and 2 and, as such, has corresponding parts that are numbered in the 400's whose tens and digit places correspond to the corresponding part on the wheelchair 12 of FIGS. 1 and 2. These corresponding parts will not be discussed in detail. The convertible wheelchair 400 includes specialty conversion components 402 (shown in exploded view) particularly for conversion between the street wheelchair 412 and an all-terrain, trail and/or beach wheelchair. In this embodiment, the conversion components 402 utilize existing frame, supports, support structures, and/or attachment structures of the street wheelchair 412.

The conversion components 402 include a first front wheel assembly 490*a* and a second front wheel assembly 490*b*. The first front wheel assembly 490*a* is configured to replace the existing first front wheel assembly 418*a* while the second front wheel assembly 490*b* is configured to replace the existing second front wheel assembly 418*b*. Particularly, the first front wheel assembly 490*a* is configured for pivotal reception in the existing boss, pivot structure or support 482*a* of the frame 413. Likewise, the second front wheel assembly 490*b* is configured for pivotal reception in the existing boss, pivot structure or support 482*b* of the frame 413. As such, the first front wheel assembly 490*a* includes a robust yoke 492*a* extending about and rotatably supporting an all-terrain or trail tire 494*a* via an axle 495*a*, the trail tire 494*a* being smaller in diameter than the first rear tire 484a. A stem 493a extends from the yoke 492a that fits into the pivot boss or support 482a. Likewise, the second front wheel assembly 490b includes a robust yoke 492b extending about and rotatably supporting an all-terrain or trail tire 494b via an axle 495b, the trail tire 494b being smaller in diameter than the second rear tire 484b. A stem 493b extends from the yoke 492b that fits into the pivot boss or support 482b. It can be appreciated that the all-terrain conversion components 102 provide an all-terrain wheelchair from a street wheelchair that can easily navigate off-road terrain.

In the standard duty conversion version, the conversion components include a first rear large low pressure tire 484a and a second rear large low pressure tire 484b and corresponding quick release pins 486a, 486b. Quick release pins 586a and 586b may be Sky-Loc™ Button-Handle pins such as those manufactured by Big Sky Precision, Inc. of Manhattan, Mont. The first rear large low pressure tire 484a can be substituted for the existing first rear wheel 416a (the preferred mode) or may be installed adjacent to the existing first rear wheel 416a. In both cases, the quick release pin 486a attaches the first rear large low pressure tire 484a to the frame after the existing first rear wheel axle is removed. The second rear large low pressure tire 484b can also be substituted for the existing second rear wheel 416b (the preferred mode) or may be installed adjacent to the existing second rear wheel 416b. In both cases, the quick release pin 486b attaches the second rear large low pressure tire 484b to the frame after the existing second rear wheel axle is removed. Other manners or methods of providing quick release may be used such as thumb screws, wing nuts, knobs or the like.

In the heavy duty conversion version, the conversion components 402 do not utilize the quick release pins 486a, 486b to attach the first and second rear low pressure wheels 484a, 484b to the frame, but includes a rear axle 450 (shown in dashed line to represent an alternate conversion components version). The rear axle 450 is supported through the existing axle bores of the frame 413 that support the first and second existing wheels 416a and 416b of the street wheelchair 412. The first rear large low pressure tire 484a is received over an end of the rear axle 450 that extends beyond the first rear wheel 416a in the case where the first rear wheel 416a remains on the wheelchair or extends beyond the rear frame where the wheelchair is sans the first rear wheel 416a. A pin 466a (shown in dashed line to represent an alternate conversion version) extends through a bore 451a at an end of the axle 450. The second rear large low pressure tire 484b is received over an end of the rear axle 450 that extends beyond the second rear wheel 416b in the case where the second rear wheel 416b remains on the wheelchair or extends beyond the rear frame where the wheelchair is sans the second rear wheel 416b. A pin 466b (shown in dashed line to represent an alternate conversion version) extends through a bore 451b at an end of the axle 450. The pins 466a, 466b are a quick release type pin such as described above. Other manners or methods of providing quick release may be used such as thumb screws, wing nuts, knobs or the like.

The various brackets, mounting structures and the like shown and described herein are exemplary of brackets, mounting structures and the like that may be used to provide conversion between the conventional wheelchair and the specialty wheelchair. Thus, variations and modifications to the brackets, mounting structures and the like are anticipated and contemplated. Likewise, the various hardware shown and described herein for attaching or mounting the various conversion components to the conventional wheelchair to make the specialty wheelchair are likewise exemplary of hardware that may be used to provide conversion between the conventional wheelchair and the specialty wheelchair. Thus, other types of hardware are anticipated and contemplated.

Other portable specialty wheelchairs may be provided by allowing attachment and/or replacement of components of the street wheelchair with other specialty wheelchair components. For instance, a water wheelchair may be provided by allowing attachment of oversized, floating "paddle" tires. Other variations are contemplated.

It should be appreciated that various mechanisms not particularly shown may be used for the various structures and or mechanisms shown herein. Thus, while the invention has been illustrated and described in detail in the drawings and foregoing description, the same is to be considered as illustrative and not restrictive in character, it being understood that only preferred embodiments have been shown and described and that all changes and/or modifications that come within the spirit of the invention are desired to be protected.

What is claimed is:

1. A portable wheelchair convertible between a street wheelchair and a specialty wheelchair, the convertible wheelchair comprising:

a street wheelchair having:

a frame carrying a seat and a back;

first and second rear wheels attached to first and second rear portions of the frame; and first and second front wheel assemblies attached to first and second front portions of the frame;

a first rear conversion bracket mounted to the first rear portion of the frame;

a second rear conversion bracket mounted to the second rear portion of the frame;

a first front conversion bracket mounted to the first front wheel assembly and having a first axle bore therethrough;

a second front conversion bracket mounted to the second front wheel assembly and having a second axle bore therethrough; and conversion components that when installed converts the street wheelchair into a specialty wheelchair, the conversion components including an axle removably receivable in the first and second axle bores, a first low pressure front tire received on one end of the axle and sized larger than the first front wheel assembly, a second low pressure front tire received on another end of the axle and sized larger than the second front wheel assembly, a first rear wheel conversion assembly having a pivoting low pressure tire and received by the first rear conversion bracket, and a second rear wheel conversion assembly having a pivoting low pressure tire and received by the second rear conversion bracket, whereby the first and second front wheel assemblies and the first and second rear wheels are elevated from ground by the first and second front low pressure tires and the first and second rear wheel conversion assemblies respectively.

2. The portable convertible wheelchair of claim 1, wherein the first and second rear conversion brackets each has a tube that receives a respective arm of respective first and second rear wheel assemblies.

3. The portable convertible wheelchair of claim 2, wherein each arm of the respective first and second rear wheel assemblies is retained in the tube of the respective first and second rear conversion brackets by releasable pins.

4. The portable convertible wheelchair of claim 3, wherein the releasable pins are D-pins.

5. The portable convertible wheelchair of claim 1, wherein the first and second rear wheel assemblies each comprise a low pressure tire retained by a yoke pivotally coupled to a plate that is connected to the respective arm.

6. The portable convertible wheelchair of claim 5, wherein the first and second front low pressure tires are each retained on the axle via a releasable pin.

7. The portable convertible wheelchair of claim 1, wherein the conversion components are configured to provide a beach specialty wheelchair.

8. The portable convertible wheelchair of claim 1, wherein the conversion components are configured to provide an all-terrain specialty wheelchair.

9. A portable wheelchair convertible between a street wheelchair and a beach wheelchair, the convertible wheelchair comprising:

a street wheelchair having:

a foldable frame carrying a seat and a back;

first and second rear wheels attached to first and second rear portions of the frame; and first and second front wheel assemblies attached to first and second front portions of the frame;

a first rear beach conversion bracket mounted to the first rear portion of the frame and having a first reception tube;

a second rear beach conversion bracket mounted to the second rear portion of the frame and having a second reception tube;

a first front beach conversion bracket mounted to the first front wheel assembly and having a first axle bore therethrough;

a second front beach conversion bracket mounted to the second front wheel assembly and having a second axle bore therethrough; and beach conversion components that when installed converts the street wheelchair into a beach wheelchair, the beach conversion components including an axle removably receivable in the first and second axle bores of the first and second front beach conversion brackets, a first low pressure front tire received on one end of the axle and sized larger than the first front wheel assembly, a second low pressure front tire received on another end of the axle and sized larger than the second front wheel assembly, a first rear wheel beach conversion assembly having a pivoting low pressure tire and a first arm received by the first reception tube, and a second rear wheel beach conversion assembly having a pivoting low pressure tire and a second arm received by the second reception tube, whereby the first and second front wheel assemblies and the first and second rear wheels are elevated from ground by the first and second front low pressure tires and the first and second rear wheel beach conversion assemblies respectively.

10. The portable convertible wheelchair of claim 9, wherein the first and second arms of the respective first and second rear wheel assemblies is retained in the tube of the respective first and second rear conversion brackets by releasable pins.

11. The portable convertible wheelchair of claim 10, wherein the releasable pins are D-pins.

12. The portable convertible wheelchair of claim 9, wherein the first and second rear wheel assemblies each comprise a low pressure tire retained by a yoke pivotally coupled to a plate that is connected to the respective first and second arm.

13. The portable convertible wheelchair of claim 12, wherein the first and second front low pressure tires are each retained on the axle via a releasable pin.

14. The portable convertible wheelchair of claim 9, wherein the first and second front beach conversion brackets each consist of first and second plates with each plate having an axle bore therein.

15. The portable convertible wheelchair of claim 14, wherein each first and second plate is mounted to opposite sides of a yoke of each of the first and second front wheel assemblies.

16. The portable convertible wheelchair of claim 15, wherein each first and second plate is mounted to opposite sides of the yoke of each of the first and second front wheel assemblies by an axle of the first and second wheel assemblies.

* * * * *